3,743,519
ACID STABILIZATION OF MEAT
BASED FOODS
Gerhard J. Haas, Woodcliff Lake, N.J., assignor to
General Foods Corporation, White Plains, N.Y.
No Drawing. Continuation-in-part of applications Ser. No. 827,030, May 22, 1969, and Ser. No. 829,720, June 2, 1969. This application July 30, 1970, Ser. No. 59,665
The portion of the term of the patent subsequent to Nov. 30, 1988, has been disclaimed
Int. Cl. A23b 1/12
U.S. Cl. 99—159         1 Claim

ABSTRACT OF THE DISCLOSURE

The invention relates to the use of caproic, caprylic and levulinic acid combined with a sorbic acid compound, and mixtures thereof, as antimycotics to preserve foods characterized by high degrees of palatability, nutrition and caloric value.

---

This application is a continuation-in-part of application Ser. No. 829,720, filed June 2, 1969, and application Ser. No. 827,030, filed May 22, 1969, both entitled "Animal Food Products."

BACKGROUND OF THE INVENTION

Field of the invention

This invention relates to intermediate moisture food products and the production thereof.

DESCRIPTION OF THE PRIOR ART

The concept of intermediate moisture food products, particularly animal foods, is set forth in U.S. Pat. No. 3,202,514; these products usually have a moisture content in excess of 10% and substantially below 75%. In general, any significant elevation of the moisture level of many foods above 10% will increase their palatability; however, it leads to microbiological decomposition unless the food products are packaged in a hermetically sealed container and commercially sterilized or maintained in a frozen or refrigerated state throughout the period of distribution and storage by the consumer.

One method of preventing microbiological decomposition in foods having moisture in excess of 10% is by employing the principle of limiting the amount of unbound water capable of supporting microbiological spoilage. This principle is disclosed in U.S. Pat. No. 3,202,514, and is known as the Aw, or the ability of the soluble solids in the food to limit the amount of "free" water available to bacteria, the bacteria's inability to survive this condition, and the subsequent shelf stability or product stability obtained by virtue of this condition.

Since shelf or product stability is the result of having substantially totally inhibited harmful mold growth, as well as bacteriological growth, it has been necessary to incorporate antimycotics such as potassium sorbate in intermediate moisture foods to prevent mold development and ultimate shelf instability. However, two objectionable aspects are attendant in the use of potassium sorbate as the antimycotic; namely, its high cost and its tendency to lessen the palatability, particularly of animal foods to dogs.

SUMMARY OF THE INVENTION

It has now been found that caproic acid or caprylic acid, which occur naturally in some cheeses and soy sauces, but not in meats, may be employed in non-intermediate moisture and intermediate moisture foods, particularly meat or meat-product animal foods as effectively as similar proportions of potassium sorbate, to prevent mold growth. It has also been found that the proportion of potassium sorbate required may be reduced if levulinic acid is combined with the potassium sorbate.

DESCRIPTION OF THE INVENTION

According to the invention there is provided a food composition containing water soluble materials, at least in part in aqueous solution, in an amount sufficient to provide an osmotic pressure which inhibits microbiological decomposition, and a mold growth inhibitor which is caproic acid, caprylic acid or a combination of levulinic acid and potassium sorbate, which mold inhibitor is present in an amount effective to limit mold growth.

The preferred products are those in which the moisture content is between 15 and 30% by weight, and the amount of water soluble solids is at least equal to the weight of moisture. As will be indicated, the invention is particularly applicable to a food composition which is an animal food having a matrix of proteinaceous meaty materials permeated with the solution of water soluble solids.

The use of these inhibitors of mold growth eliminates: (1) the problems of the high cost of employing potassium sorbate in proportions sufficient to totally inhibit mold growth in meat or meat-product animal foods (0.3% by weight); (2) the reduced palatability to dogs of animal foods containing 0.3% by weight of potassium sorbate; and it has been found that they are just as effective as potassium sorbate alone in preventing mold growth.

Although the formulations of the invention will be described herein, particularly on animal or pet food varieties, the benefits of microorganic stabilization herein presented will likewise be applicable to conventional human foods and intermediate moisture human foods having a bacteriostatic or stabilizing quantity of water soluble solutes. Among the intermediate moisture human foods which will be so stabilized are sausage-like formulations, liquid preparations such as syrup, simulated cheeses and egg products, French toast, pancake and waffle products, and the like. These foods may be aerobically packed in a non-hermetic wrapper such as cellophane, whereupon such packaged products can be stored without refrigeration for periods of 3 to 6 months or longer.

The type of antimycotics permitted in animal foods are few, and the characteristics and activities of these materials in moist systems have been adequately described in textbooks. However, little information is available on the activity of these antimycotics and preservatives in systems of lower moisture, where the reduced water activity has an inhibiting action per se on microorganisms.

The relative weight percent of water soluble solids to moisture content of the animal food, when initially incorporated into the animal food during its manufacture and preparatory to packaging determines the ultimate functionality of the solids in providing the requisite bacteriostatic effect. Usually the amount of moisture will range from 15 to 30%. The amount of water soluble solids (principally sugar) may be varied, as may the level of moisture incorporated within the desired ranges. However, in varying these levels the relationship of the water soluble solids in solution to the water should be controlled so as to afford the desired osmotic pressure. A good rule to observe in this connection is to be sure that the water soluble solids available for solution are at least equal to the weight of moisture present, although in some cases it is possible that a lower level of water soluble solids might afford some protection against microbiological decomposition provided an equivalent degree of osmotic pressure is available to protect the product.

In performing tests to determine the effect of mold growth inhibitors, for instance levulinic acid alone, and in combination with potassium sorbate, on non-intermediate moisture and intermediate moisture meat and meat-product animal foods, a system was developed which would maintain most of the characteristics of reduced water meat and meat product animal foods and, at the same time, accelerate mold growth to such an extent that useful results could be obtained by inspection for visual growth of generic microorganisms such as Aspergilli and Pennicillia within weeks.

To judge the degree of inhibition, the tests were carried out at 23° C. and 33° C. The samples were inspected daily and the number of days for visible mold formation determined. In the effectiveness scale, 0 represents no extension of shelf life or extension for less than double the control which contained no antimicrobial or antimycotic, 1 is double to triple the shelf life, 2 is triple to quadruple the shelf life, 3 is quadruple to tenfold the shelf life, 4 is at least tenfold the shelf life, and 5 signifies complete inhibition or approximately six months at both storage temperatures.

The following example will more specifically set forth the preferred embodiment of the invention.

EXAMPLE I

Meat-product animal food

Ingredients: Parts by weight
Chopped meat by-products (tripe, udders, cheek trimmings, tongue trimmings, gullets, etc.) _____ 32.0
Defatted soy flakes _____ 31.0
Sucrose _____ 24.0
Flaked soy bean hulls _____ 3.0
Dicalcium phosphate _____ 3.0
Dried non-fat milk solids _____ 2.5
Bleachable fancy tallow _____ 1.0
Mono- and diglycerides _____ 1.0
Sodium chloride _____ 1.0
Red dye _____ 0.006
Garlic _____ 0.2
Vitamin and mineral premix _____ 0.06

An intimate mixture of the foregoing ingredients was made by first chopping the meat by-products into small pieces, which were then heated in combination with tallow to 212° F. to effect pasteurization and produce a liquefied slurried meat composition. The aforesaid slurry was then finely ground into a more or less pulpy, pumpable, flowable puree consistency. This hot pureed form of slurry was then proportionately blended with the remaining dry ingredients of the formulation in a steam jacketed cooker wherein it remained for a period of approximately 1½ minutes at an elevated temperature of about 200° F., the product being under continuous agitation throughout this cooking phase. This cooked mixture had a plastic, extrudable, shape-retaining consistency. The moisture content of this composition was 25%. The finely comminuted meat by-products and the soya flakes had the aqueous phase evenly distributed throughout, thereby assuring a maximum bacteriological protection to the final product.

The pasteurized mixture was immediately cooled by passage through a refrigerated heat exchanger to an ambient temperature.

The samples used in the test are a blend of one-half of a meat-product animal food and one-half of a 45% sucrose solution; however, without potassium sorbate or any other antimycotic. A sucrose solution is used because the liquid phase of the meat-product animal food is a solution, where most of the solute is sucrose. The sample was divided into parts and antimycotics were mixed thoroughly into each for one minute at medium speed, and half the paste of each sample was transferred to jars and stored at room temperature (about 23° C.) and the other half at 33° C. The results of these tests appear in Table I.

TABLE I

| Antimycotic | Percentage tested | Degree of inhibition at top level | Level for total inhibition |
|---|---|---|---|
| Potassium sorbate | 0.1, 0.3 | 5 | 0.3 |
| Levulinic acid | 1.0 | 0 | |
| Caproic acid | 0.1, 0.2 | 5 | 0.2 |
| Caprylic acid | 0.1, 0.3 | 5 | 0.3 |

TABLE II

| Antimycotic | Days of first visible mold growth | |
|---|---|---|
| | 23° C. storage | 33° C. storage |
| None | 7 | 4 |
| Potassium sorbate, 0.1% | 15 | 7 |
| Potassium sorbate, 0.3% | >70 | >70 |
| Levulinic acid, 0.1% / Potassium sorbate, 0.1% | 32 | 170 |
| Levulinic acid, 1.0% | 8 | 6 |
| Levulinic acid, 0.1% | 8 | 6 |
| Caproic acid, 0.2% | >70 | >70 |
| Caprylic acid, 0.3% | >70 | >70 |

Inasmuch as the step of diluting the meat-product animal food in half with 45% sucrose solution results in increased Aw, any antimycotic which is active under these more stringent conditions of Aw and temperature could be expected to be considerably more effective in undiluted meat-product animal foods having a low Aw; and such was the case.

EXAMPLE II

Same as Example I, except that the 45% sucrose solution was omitted. In this example, the water soluble sugar solids were maintained between 15 to 35% by weight of the composition, and the weight level of water soluble solids is at least equal to or greater than that of the moisture of the composition; said moisture weight range being from 15 to 30% of the composition.

TABLE III

| Antimycotic | Days of first visible mold growth | |
|---|---|---|
| | 23° C. storage | 33° C. storage |
| Potassium sorbate, 0.3% | >170 | >170 |
| Caproic acid, 0.2% | >170 | >170 |
| Caprylic acid, 0.3% | >170 | >170 |
| Levulinic acid, 0.1% / Potassium sorbate, 0.1% | >170 | >170 |

The intermediate moisture samples employed in Example II had a moisture content between 22 to 23.5%. In Table III of Example II, it can readily be seen that the relationship between the moisture content of the intermediate moisture meat-product animal food employing the various antimycotics, and the speed of visible contamination could not be determined up to 170 days; after which the experiment was terminated.

The results of Example I indicate that the use of caproic and caprylic acids in non-intermediate moisture meat-product animal foods is as effective as similar proportions of potassium sorbate in preventing mold growth.

While the invention discloses and describes the use of caproic and caprylic acids alone as being just as effective as potassium sorbate in inhibiting mold growth, it is to be understood that any and all combinations of caproic acid, caprylic acid and potassium sorbate may be employed in the invention at levels effective to prevent mold growth.

In Example I, it may be seen that the use of levulinic acid in amounts as high as 1.0% is not effective in totally inhibiting mold growth, and that 0.3% potassium sorbate must be present to totally inhibit mold growth. However, the combination of one-half levulinic acid and one-half potassium sorbate is more effective than about twice that of either alone in preventing mold growth on diluted or non-intermediate moisture meat-product animal foods.

While the invention discloses and describes the use of one-half levulinic acid in combination with one-half potassium sorbate to inhibit mold growth, it is to be understood that any and all combinations of levulinic acid and potassium sorbate, with or without caproic and caprylic acid, may be employed in the invention at levels effective to prevent mold growth.

The claim defining the invention is as follows:

1. A method of stabilizing moist food compositions comprising a matrix of meat based materials having an aqueous solution of water-soluble solids incorporated in said matrix mateials, the moisture levels in said compositions ranging from about 15 percent to about 30 percent by weight of the composition and the level of water-soluble solids being at least equal to the weight of moisture in the composition which comprises incorporating in the composition a mold growth inhibitor selected from the group consisting of (1) 0.1 percent levulinic acid and 0.1 percent potassium sorbate by weight of the composition. (2) 0.3 percent caprylic acid by weight of the composition; (3) 0.2 percent caproic acid by weight of the composition; and (4) mixtures thereof to prevent mold growth.

References Cited
UNITED STATES PATENTS

| | | | |
|---|---|---|---|
| 3,564,098 | 2/1971 | Erwin et al. | 424—317 |
| 3,202,514 | 8/1965 | Burgess et al. | 99—2 |
| 2,831,769 | 4/1958 | Kamlet | 424—317 |
| 3,510,317 | 5/1970 | Fernholz et al. | 99—150 |
| 2,476,802 | 7/1949 | Bollens | 99—171 CA |
| 3,275,505 | 9/1966 | Herschler | 424—317 |
| 3,276,881 | 10/1966 | Troller | 99—139 |
| 3,486,909 | 12/1969 | Luck | 99—162 |
| 3,623,884 | 11/1971 | Haas | 99—7 |
| 3,658,548 | 4/1972 | Haas | 99—2 R |

NORMAN YUDKOFF, Primary Examiner

C. P. RIBANDO, Assistant Examiner

U.S. Cl. X.R.

99—2 R, 224